United States Patent
Tang et al.

(10) Patent No.: US 11,195,220 B2
(45) Date of Patent: Dec. 7, 2021

(54) SYSTEMS AND METHODS FOR ARTIFICIAL INTELLIGENCE-BASED PERSONALIZED PURCHASE RECOMMENDATIONS

(71) Applicant: Capital One Services, LLC, McLean, VA (US)

(72) Inventors: Qiaochu Tang, The Colony, TX (US); Stephen Wylie, Carrollton, TX (US); Micah Price, Plano, TX (US); Staevan Duckworth, The Colony, TX (US); Olalekan Awoyemi, Prosper, TX (US); Geoffrey Dagley, McKinney, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 90 days.

(21) Appl. No.: 16/370,558

(22) Filed: Mar. 29, 2019

(65) Prior Publication Data

US 2020/0311796 A1 Oct. 1, 2020

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06F 16/9535* (2019.01); *G06N 3/08* (2013.01); *G06Q 30/0641* (2013.01)

(58) Field of Classification Search
CPC .. G06Q 30/0631; G06Q 30/0641; G06N 3/08; G06F 16/9535
(Continued)

(56) References Cited

U.S. PATENT DOCUMENTS

| | | | |
|---|---|---|---|
| 8,255,291 B1 | 8/2012 | Nair | |
| 2002/0010625 A1* | 1/2002 | Smith | G06Q 30/02 705/14.52 |

(Continued)

FOREIGN PATENT DOCUMENTS

CN 107292696 A 10/2017

OTHER PUBLICATIONS

Tran, T. and Cohen, R.: 2000, 'Hybrid Recommender Systems for Electronic Commerce'. In Knowledge-Based ElectronicMarkets, Papers from the AAAIWorkshop, AAAI Technical Report WS-00-04. pp. 78-83. Menlo Park, CA: AAAI Press. (Year: 2000).*

*Primary Examiner* — Anand Loharikar
(74) *Attorney, Agent, or Firm* — Bookoff McAndrews, PLLC

(57) ABSTRACT

According to certain aspects of the disclosure, a computer-implemented method may be used for determining one or more vehicle recommendations. The method may include receiving data pertaining to a user's internet browsing activity. The received data may be indicative of the user's automotive vehicle preferences. The method may include comparing the received data to a collection of stored vehicle qualities. The method also may include identifying, based on the received data and the comparison of the received data to the collection of stored vehicle qualities, a vehicle characteristic of interest to the user. Using the vehicle characteristic of interest, one or more vehicle recommendations may be determined. One or more vehicle recommendations may be communicated to the user.

19 Claims, 4 Drawing Sheets

(51) Int. Cl.
*G06N 3/08* (2006.01)
*G06F 16/9535* (2019.01)

(58) Field of Classification Search
USPC .............................................. 705/26.1–27.2
See application file for complete search history.

(56) References Cited

U.S. PATENT DOCUMENTS

2010/0299190 A1* 11/2010 Pratt .................. G06Q 30/0282
  705/14.4
2016/0364783 A1  12/2016 Ramanuja et al.
2018/0174222 A1   6/2018 Venkatakrishnan et al.

* cited by examiner

SYSTEMS AND METHODS FOR ARTIFICIAL INTELLIGENCE-BASED PERSONALIZED PURCHASE RECOMMENDATIONS

TECHNICAL FIELD

Various embodiments of the present disclosure relate generally to providing purchase recommendations to users based on the user's preferences and/or the preferences of a population, and more specifically to artificial intelligence-based purchase recommendations.

BACKGROUND

Purchasers of relatively expensive items, such as cars, real estate, mattresses, boats, computers, etc. may conduct part or all of their shopping for such items online, via the internet. In researching and completing such a purchase, a consumer may visit multiple websites in search of appropriate information. For example, consumers may view inventory information or perform other research regarding a purchase on multiple websites. However, different websites may vary both in the manner in which they present information and in the scope of the information presented. Thus, a user may be unable to find certain information on a particular website and/or may be unsure of where such information is located.

Furthermore, in areas of commerce such as those described above, the amount of information available may be so large as to be prohibitive for an individual consumer to obtain, analyze, and/or synthesize the information. Thus, consumers may make sub-optimal purchase decisions due to a lack of accessible and/or digestible information.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for determining one or more recommendations. Each of the examples disclosed herein may include one or more of the features described in connection with any of the other disclosed examples.

In one example, a computer-implemented method may be used for determining one or more vehicle recommendations. The method may include receiving data pertaining to a user's internet browsing activity. The received data may be indicative of the user's automotive vehicle preferences. The method may include comparing the received data to a collection of stored vehicle qualities. The method also may include identifying, based on the received data and the comparison of the received data to the collection of stored vehicle qualities, a vehicle characteristic of interest to the user. Additionally, using the vehicle characteristic of interest, one or more vehicle recommendations may be determined, and the one or more vehicle recommendations may be communicated to the user.

According to another aspect of the disclosure, a computer-implemented method may comprise analyzing literature pertaining to automotive vehicles. Using the analyzed literature, preferences of a vehicle-purchasing population may be determined. The method also may include analyzing internet browsing activity of an individual user. Using the internet browsing activity of the individual user and the determined preferences of the vehicle-purchasing population, one or more vehicle recommendations may be determined for the individual user. The one or more vehicle recommendations may be communicated to the individual user.

According to still another aspect of the disclosure, a computer system for providing vehicle purchase recommendations may include a memory having processor-readable instructions stored therein and a processor configured to access the memory and execute the processor-readable instructions to perform a plurality of functions. The functions may include analyzing a first set of data from a first webpage, wherein the first set of data is indicative of a user's vehicle-purchasing preferences. The functions also may include analyzing a second set of data from a second webpage, wherein the second set of data is indicative of the user's vehicle-purchasing preferences. The functions further may include using the analysis of the first set of data and the second set of data, generating a user profile pertaining to the user's vehicle-purchasing preferences. The functions also may include comparing the user profile to a database of vehicle characteristics. The functions additionally may include using the comparison of the user profile to the database of vehicle characteristics, generating a vehicle purchase recommendation. The functions further may include communicating the vehicle purchase recommendation to the user.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
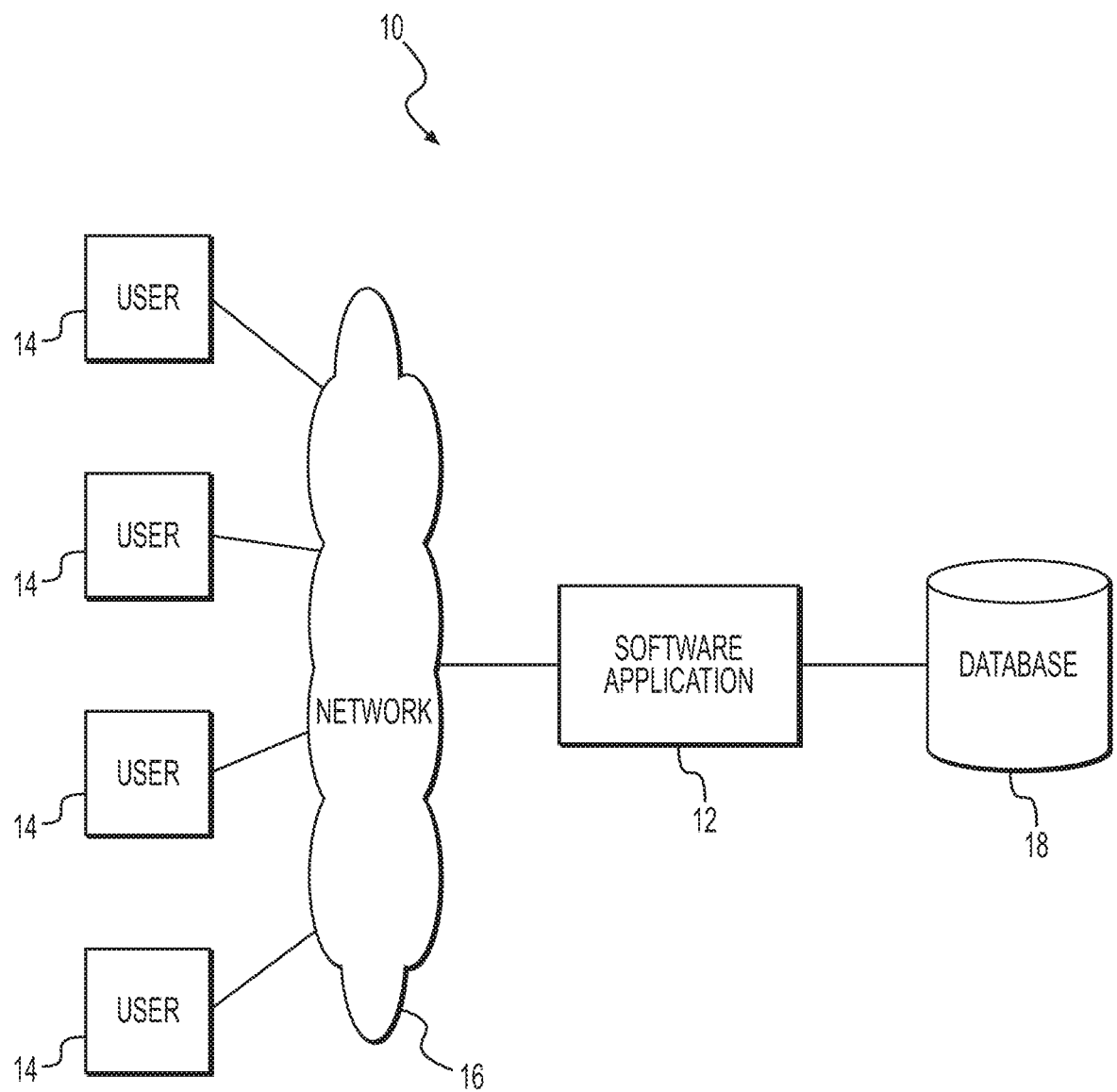
FIG. 1 is a block diagram of an artificial intelligence system for providing personalized purchase recommendations, according to one or more embodiments.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides methods and systems for providing purchase recommendations to consumers via, for example, a plug-in application, which may have chat capabilities. While automotive vehicles are referenced herein as an exemplary application for the systems and methods described herein, it will be understood that this disclosure is not limited to automotive vehicles and may apply to other contexts, such as real estate, technology, boats, mattresses, and/or other items. The systems and methods described herein may be used in order to present information to consumers. For example, the disclosed systems and methods may be used to present information regarding a vehicle to a customer, even if the information is available on the webpage a customer is visiting. The disclosed systems and methods also may learn a user's preferences over time and may deliver recommendations to the user in accordance with those preferences. The systems and methods disclosed herein may base these recommendations at least in part based on information gathered regarding the vehicle-purchasing preferences of a population. For example, a plug-in application according to the disclosure may act as an adviser to a user. While the disclosure includes descriptions of exemplary methods, it will be understood that the steps of each method may be combined in various combinations or permutations and/or may be mixed and matched. For example, a step from one exemplary method may be used in conjunction with steps of another exemplary method.

FIG. 1 shows an exemplary system 10 for providing vehicle purchase recommendations. Recommendation system 10 may include a software application 12 configured to perform a variety of operations, as will be discussed in further detail below. Application 12 may provide, for example, a plug-in application that works in conjunction with an internet browser. For example, a user 14 may install application 12 to work alongside their internet browser or independently of their internet browser. Application 12 may then access browsing information for user 14 across multiple websites. Additionally or alternatively, application 12 may be utilized by one or more websites on a network 16. Application 12 may be a plug-in application that is utilized by one or more websites and that is usable by user 14 when user 14 visits a website using application 12. Multiple users 14 may access application 12 via, for example, network 16. While five users 14 are shown in FIG. 1, that illustration is merely exemplary and any number of users 14 may access application 12. Users 14 may be, for example, vehicle purchasers, vehicle researchers, and/or vehicle enthusiasts.

Application 12 may store data in and/or access data from a database 18. Database 18 may have any features known or to become known in the art. Information from database 18 may be utilized across various websites, whether application 12 is installed by user 14 (e.g., as a browser plug-in) or is installed by website owners on the sites themselves or by another party (e.g., a party providing a browsing application).

Application 12 may have artificial intelligence capabilities. For example, application 12 may utilize a neural net (e.g., a machine learning model modeled after a human/animal brain or network). The neural net may consist of convolutional layers and/or fully connected layers. The neural net may be structured so as to have a sense of time or trends, such as long short-term memory (LSTM) units or networks. Additionally or alternatively, application 12 may utilize other forms of machine learning, deep learning, and/or artificial intelligence. Application 12 may utilize any methodology that is known or becomes known. Application 12 may be capable of upgrading over time, either via intervention by a party such as user 14 or automatically. During operation, the quantity and/or quality of capabilities of application 12 may increase as application 12 gains access to more information.

Application 12 may analyze sources of information pertaining to, for example, automotive vehicles and vehicle purchases. For example, application 12 may gather information via and/or analyze articles written about vehicles, reviews of vehicles, discussion forums, purchase websites, blog posts, or any other type of information pertinent to vehicle purchasing. For example, application 12 may include web crawler (e.g., spider) capabilities to systematically browse the internet. Application 12 may use a neural net or other artificial intelligence capability in order to analyze a vast array of web content.

For example, application 12 may analyze all, nearly all, or a substantial portion of articles written about vehicles in general or about specific vehicles. Based on this analysis, application 12 may determine characteristics of interest to a particular vehicle-purchasing/researching community. For example, application 12 may analyze interests of buyers/researchers of a certain age group, economic status, automotive enthusiasm level, family status, location, interests, hobbies, use level, etc. Application 12 may develop correlations between vehicle purchaser/researcher characteristics with automotive interests. For example, individuals with children may in general have greater interest in vehicle safety profiles. People who like to ski may have an interest in four-wheel drive vehicles or in vehicles with cargo racks. Drivers in colder climates may prefer cars with heated seats or four-wheel drive. Application 12 may analyze and combine different profile characteristics of a population. For example, application 12 may combine the different values of multiple categories of individuals in order to identify composite profiles. For example, application 12 may analyze data in order to determine interests of people who have multiple characteristics such as, e.g., having young children and an interest in watersports. For such people, application 12 may determine that attributes such as safety and towing capability are highly valued. Application 12 may build and/or maintain a library or otherwise store information relating to preferences of a vehicle-purchasing/researching population. Application 12 may consider multiple populations and/or subpopulations (e.g., a US population, a worldwide population, a state population, a population of a certain age, a population of active car buyers, etc.)

Application 12 also may analyze particular preferences of a user 14 across one or multiple websites. For example, application 12 may analyze viewing habits of user 14 in order to determine user's 14 preferences. For example, application 12 may determine that user 14 has viewed multiple vehicles having a shared characteristic. Application 12 may determine that user 14 is seeking a vehicle with such a characteristic or with a similar characteristic. Application 12 also may, for example, analyze articles that user 14 has read or analyze other information that user 14 has viewed. Such information may or may not be a car listing. For example, application 12 may consider that a user has read articles and/or participated in message boards pertaining to high performance vehicles, such as sports cars. Application 12 may consider such viewing habits and determine characteristics that user 14 is interested in based on those page views.

Application 12 also may have chat or other capabilities, enabling application 12 to receive and respond to questions from user 14. For example, application 12 may analyze natural-language text input by user 14, may identify characteristics relevant to the question and/or the interests of user 14, and may respond to the question. A response to a question may utilize information present on a webpage user 14 is visiting or may not rely on information from a presently-viewed webpage. For example, application 12 may present to user 14 information that is not available on a webpage currently being viewed.

Application 12 may build a profile for user 14 based on browsing activity of user 14 and/or information gleaned by analyzing literature applying to a population larger than the individual user 14. A profile of user 14 may include, for example, demographic information, browsing history, comparisons to other users 14, stated preferences, unstated preferences, priorities, interests, hobbies, etc. A profile of user 14 may be used to generate recommendations for user 14.

Figure 2:
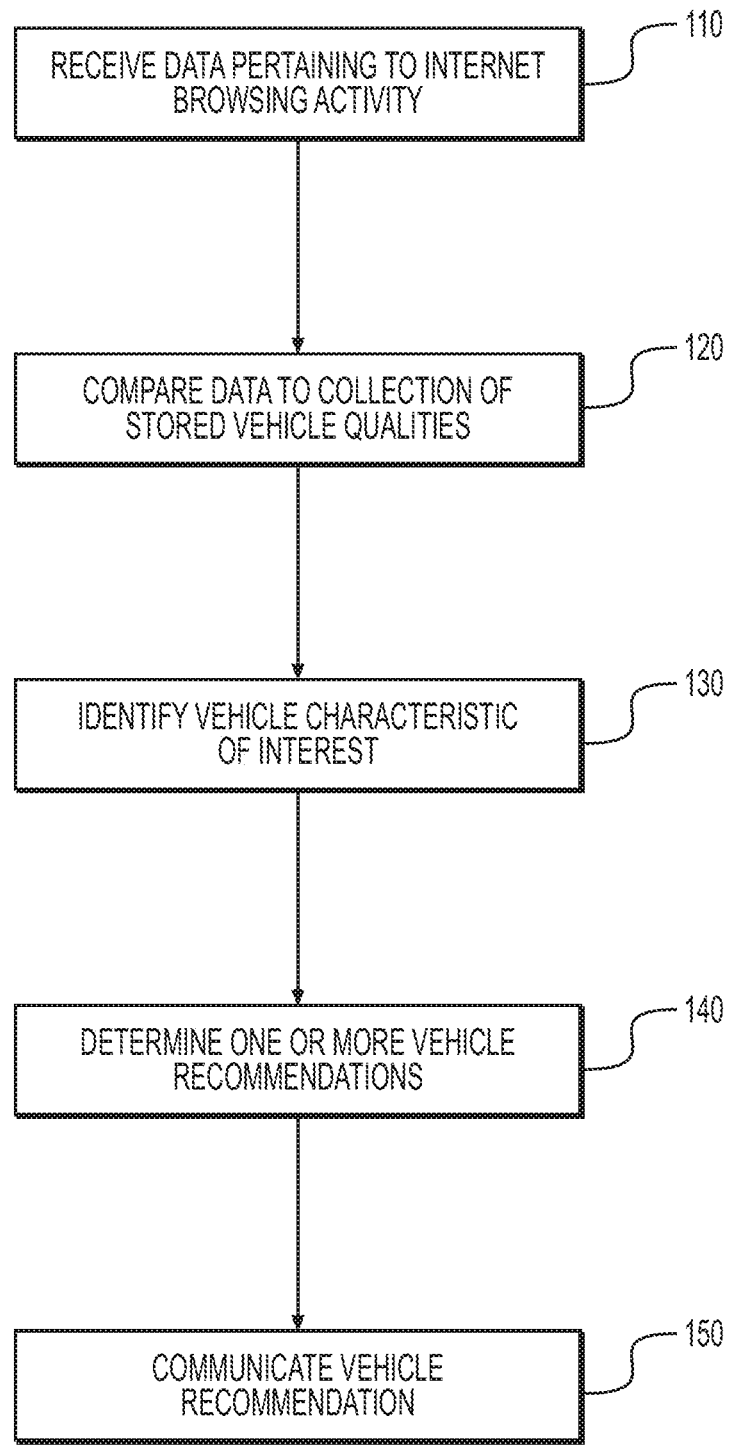
FIGS. 2-4 are flow charts showing exemplary methods for providing personalized purchase recommendations, according to one or more embodiments.

FIG. 2. depicts an exemplary method 100 for providing a vehicle recommendation. In step 110, a component of a system such as system 10 (e.g., application 12) may receive data pertaining to internet browsing activity of user 14. The received data may include any of the information described above, with respect to FIG. 1. Data received in step 110 may pertain to one or more webpages. For example, the data received in step 110 may include a history of pages visited by user 14, trends of information viewed by user 14, information from a particular webpage viewed by user 14, qualities of a vehicle of interest to user 14, demographic information related to user 14, financial information and preferences of user 14, etc. Data received in step 110 may be indicative of one or more of current browsing activity and/or past browsing activity of user 14.

Additionally, data received in step 110 may be indicative of one or more properties of a vehicle of interest to user 14. For example, in step 110, data may be received from a webpage such as a car shopping webpage. Data may pertain to the qualities of a vehicle user 14 has viewed. Additionally or alternatively, data may pertain to articles or other informational webpages user 14 has viewed. Data also may pertain to personal information and may be indicative of vehicle preferences of user 14.

In step 120, data obtained in step 110 may be compared to a collection of stored vehicle qualities. For example, step 120 may make use of a library of information, such as that described above with regard to FIG. 1. A collection of stored vehicle qualities used in step 120 may be obtained via any of the methods described herein. For example, a collection of stored vehicle qualities may be obtained from and/or indicative of a vehicle purchasing/researching population (e.g., a population as a whole), subpopulation thereof, and/or from a specific user 14. Vehicle characteristics or qualities utilized in step 120 may be obtained via a neural net, as described above. Stored vehicle qualities may include any qualities such as safety information, handling information, climate control, entertainment features, audio system information, decorative features, storage features, etc. For example, application 12 may have access to information regarding every car model for sale in the United States (or another jurisdiction). Information about car models could be stored in, for example, database 18 of system 10. Such information may be updated at regular intervals and/or on a "push" basis. Application 12 may associate characteristics of a population, user 14, or another individual with stored vehicle characteristics via a neural net or other such machine learning techniques. For example, certain car models may be associated with safety-minded consumers or with performance-focused consumers. As noted above, artificial intelligence such as a neural net may be used to analyze literature such as articles pertaining to vehicles and may identify characteristics of interest to an individual user 14 or to a population of individuals (which may include one or more users 14) based on the analysis.

In step 130, a characteristic of interest to user 14 may be identified. For example, browsing activity of user 14, alone or in combination with stored vehicle qualities, may indicate that user 14 has an interest in, for example, vehicles equipped for cold weather use. Application 12 may associate that interest with, for example, all-wheel drive. Application 12 also may associate that interest with additional characteristics such as, for example, heated seats.

In step 140, application 12 may determine one or more vehicle recommendations. For example, if application 12 has determined that qualities such as all-wheel drive and heated seats are desirable to user 14, application 12 may recommend a vehicle having those qualities to user 14. Application 12 also may consider multiple dimensions of interest. For example, a particular user 14 may desire a car that is suitable for winter driving and also has luxury entertainment features. Application 12 may provide a recommendation that satisfies all or as many of these interests as possible. Application 12 may, through artificial intelligence capabilities, rank or prioritize the qualities desired by user 14. A vehicle recommendation of step 140 may be determined based on preferences of user 14 and/or preferences of a vehicle-purchasing/researcher population or subpopulation. For example, a recommendation may compare preferences of user 14 to preferences of a population.

In step 150, application 12 may communicate or otherwise convey the vehicle recommendation of step 140 to user 14. For example, application 12 may communicate the recommendation via text, photo, hyperlink, video, audio, or any other method. Application 12 may also display a recommendation on a search engine results page as, for example, an advertisement. Where application 12 is a plug-in application or includes a plug-in application, such a recommendation may be made using, for example, the plug-in application. Alternatively, a recommendation could be delivered via SMS or other message, by email, or by any other suitable communication mechanism. Application 12 may communicate the recommendation, either simultaneously or sequentially, to multiple people, such as identified members of a family. Application 12 may include functionality for user 14 to provide feedback to application 12 regarding the recommendation. For example, if the delivered recommendation was not satisfactory to user 14, application 12 may incorporate and/or take into account the feedback of user 14 in making future recommendations. It is understood that step 110 may occur while user 14 is visiting a first webpage, and step 150 may occur while user 14 is visiting a second webpage, different from the first webpage. Step 110 may involve obtaining data from a plurality of webpages, and step 150 may occur while user 14 is visiting a webpage that is different from at least one of the plurality of webpages utilized in step 110.

Figure 3:
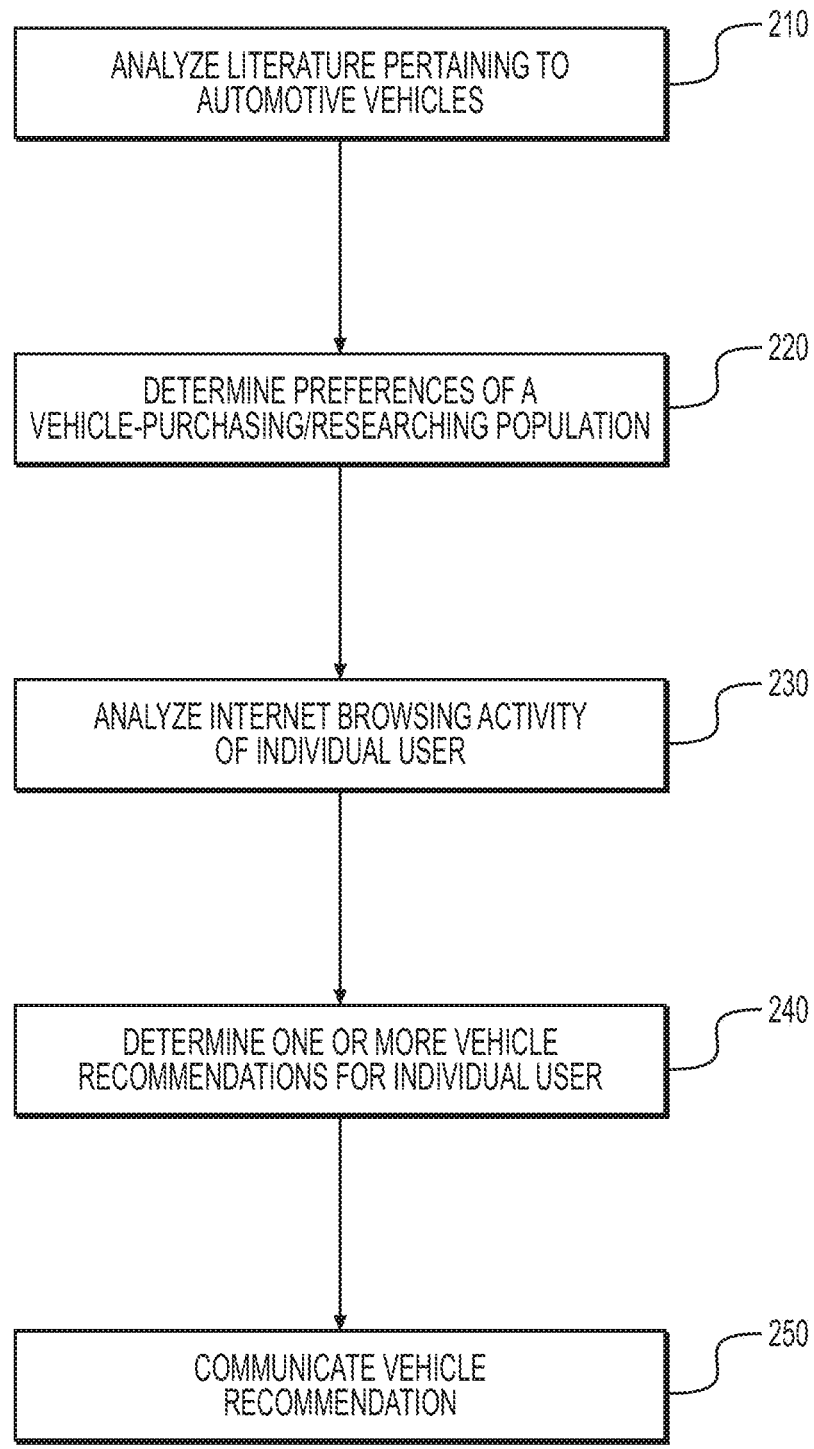

FIG. 3 depicts a further exemplary method 200 for providing vehicle recommendations. In step 210, a component of system 10, such as application 12, may analyze literature pertaining to automotive vehicles. Such analysis may include any of the steps or aspects discussed above, including analysis using artificial intelligence systems, such as neural nets. As discussed in further detail above, application 12 may "crawl" the internet or may otherwise access literature and other documents (e.g., blog posts, vehicle listings, social media data, etc.) regarding vehicles or other products. Application 12 may apply any suitable methods of analysis to the analyzed data.

In step 220, a component such as application 12 may determine preferences of a vehicle-purchasing/researching population. Step 220 may utilize any of the processes discussed above with regard to FIGS. 1 and 2 (e.g., for steps 120 and/or 130). For example, application 12 may determine, using a neural net or other framework, characteristics of a vehicle-purchasing/researching population and associated preferences. As discussed above, application 12 may consider numerous population characteristics and consider overlapping or disparate interests of populations with different characteristics.

In step 230, application 12 may analyze internet browsing activity of an individual, such as user 14. Step 230 may use any of the approaches discussed above, e.g., with respect to step 110. For example, application 12 may analyze browsing activity of user 14 on one or more websites, including vehicle shopping-websites, websites containing information or literature pertaining to vehicles (e.g., review websites, enthusiast websites, or research websites), and/or websites not directly related to vehicle purchasing. Application 12 may analyze browsing activity of user 14 to determine demographic data, interests, priorities, budget, and/or other information pertinent to user 14.

In step 240, application 12 may determine one or more vehicle recommendations for user 14. Step 240 may apply any of the techniques described above, such as those discussed with respect to step 140. In step 250, a vehicle recommendation may be communicated by application 12 to user 14. Step 250 may use any of the techniques described above, such as those described with regard to step 150. As also described in further detail above, application 12 may be configured to receive and answer questions from user 14 at any point during the above process. The information communicated in step 250 may be unavailable on a webpage user 14 is currently viewing at the time the one or more vehicle recommendations is communicated. Additionally, at any other point in method 200, application 12 may consider and/or communicate information unavailable on a webpage user 14 is currently viewing.

Figure 4:
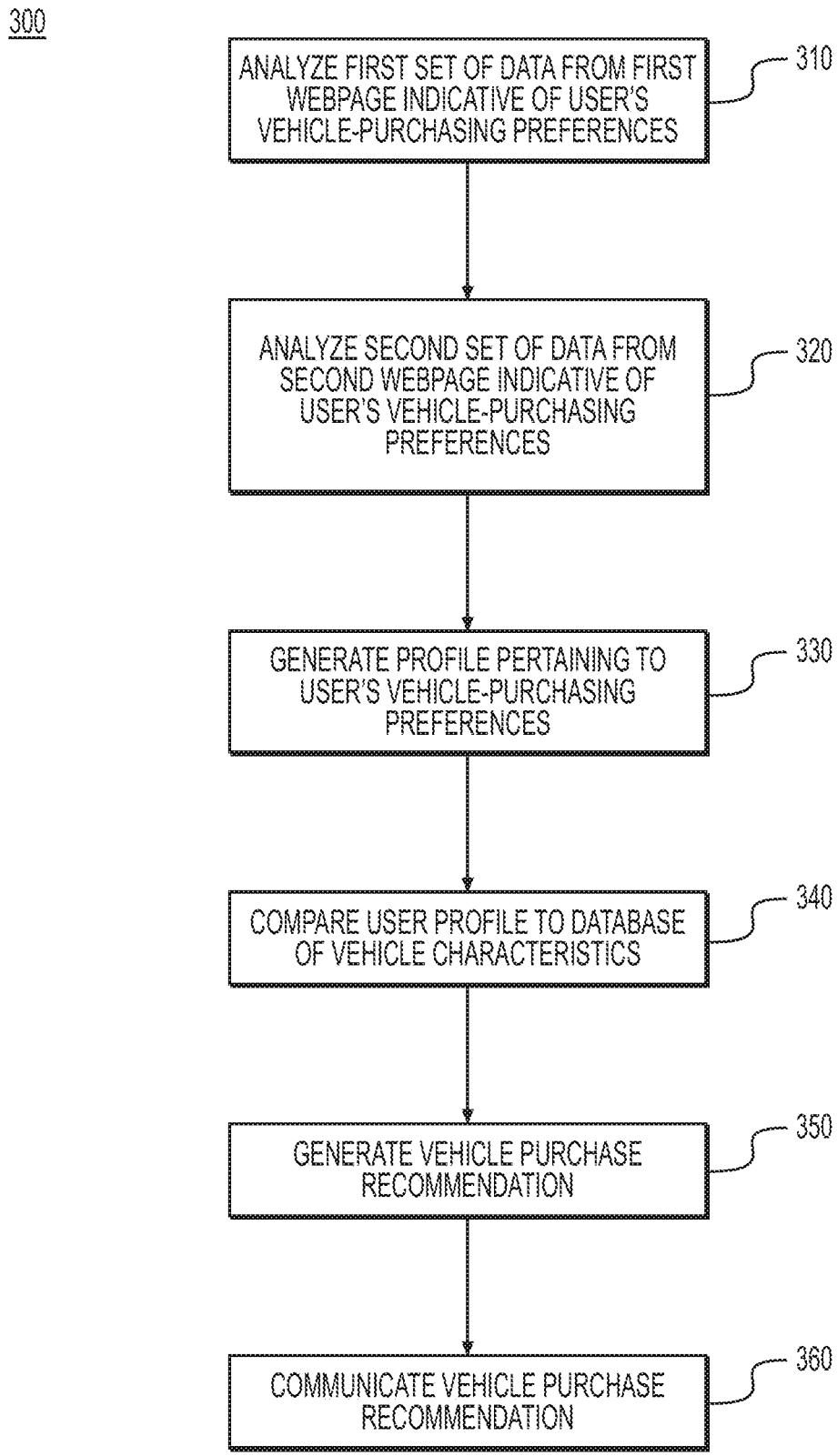

FIG. 4 shows a further exemplary method 300 for making vehicle recommendations. In step 310, a component of system 10, such as application 12, may analyze a first set of data from a first webpage that is indicative of vehicle-purchasing preferences of user 14. Step 310 may utilize any of the techniques described above, such as those described with regard to steps 110, 130, and/or 230. For example, application 12 may analyze data from a car-purchasing webpage, a webpage having vehicle information, or a page not relating directly to vehicles but that is indicative of the values, interests, demographics, or preferences of user 14. For example, application 12 may analyze data from a particular vehicle that user 14 views. Alternatively or additionally, application 12 may analyze articles read by user 14 in order to determine the qualities of interest to user 14. Alternatively or additionally, application 12 may analyze a webpage not directly related to car-purchasing (e.g., a social media page) in order to determine the characteristics of user 14 that may be relevant to car-purchasing preferences.

In step 320, application 12 may analyze a second set of data from a second webpage that is indicative of the vehicle-purchasing preferences of user 14. Step 320 may utilize any of the techniques of step 310, described above. The first and second webpages of steps 310 and 320 may be webpages in the same category or may be different types of webpages. For example, the first and second webpage may both be listings for specific vehicles. Alternatively, the first webpage may be a vehicle listing (or any other type of webpage), and the second webpage may be an article or a social media page (or any other type of webpage).

In step 330, application 12 may generate a profile pertaining to the vehicle-purchasing preferences of user 14. Aspects of the profile may include any information discussed above with respect to FIGS. 1-3. For example, a profile may include, among other things, demographic information, budget information, hobbies, interests, family information, environmental information, entertainment preferences, feature preferences, safety preferences, performance preferences, etc. A profile generated in step 330 may be further enriched over time. For example, as user 14 visits further webpages, a profile generated for user 14 may be iteratively updated. Certain characteristics of the profile may change over time, or additional characteristics may be added. Application 12 also may provide an option for user 14 to manually input, change, or update certain profile information.

In step 340, a profile of user 14 may be compared to a database of vehicle characteristics. Such a database may be developed using, for example, the techniques of steps 210 and/or 220. Step 340 may incorporate any of the aspects described above, such as those described with regard to steps 120, 130, or 230. For example, safety concerns of user 14 may be cross-referenced to safety concerns of a population as a whole. Application 12 may combine different characteristics and weigh different characteristics in different manners, depending on the user profile, the preferences of a larger population, or other factors.

In step 350, application 12 may generate a vehicle purchase recommendation. Step 350 may utilize any of the techniques described above, including those described with respect to steps 140 or 240. In step 360, application 12 may communicate a vehicle purchase recommendation, using any of the techniques described above, such as those pertaining to steps 150 or 250.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for determining one or more vehicle recommendations, comprising:
    accessing a plurality of literature sources pertaining to vehicles, the plurality of literature sources indicative of a plurality of population characteristics and a plurality of vehicle characteristics;
    inputting the plurality of literature sources into a neural net configured to determine groupings of one or more of the population characteristics and one or more of the vehicle characteristics that, based on the plurality of literature sources, are correlated with each other;
    using the determined groupings to generate a library that, for each of the groupings:
        defines a purchaser population based on the one or more population characteristics of the grouping; and
        associates the defined purchaser population with the one or more vehicle characteristics of the grouping;
    receiving a user's internet browsing history;
    using the received internet browsing history, developing a profile of the user indicative of one or more population characteristics of the user;
    comparing the one or more population characteristics of the user to the population characteristics of the plurality of purchaser populations stored in the library to identify one or more purchaser populations sharing at least one of the one or more population characteristics of the user;
    identifying one or more of the vehicle characteristics associated with the one or more identified purchaser populations as one or more vehicle characteristics of interest to the user;
    using the one or more vehicle characteristics of interest to the user, determining one or more vehicle recommendations; and
    communicating, to a user device associated with the user, the one or more vehicle recommendations.

2. The computer-implemented method of claim 1, wherein the received internet browsing history is obtained while the user is visiting a first webpage, and wherein the one or more vehicle recommendations is communicated to the user while the user is visiting a second webpage, wherein the second webpage is different than the first webpage.

3. The computer-implemented method of claim 1, wherein the literature includes at least one of an article, a blog post, a review, or a discussion forum.

4. The computer-implemented method of claim 1, further including:
    responding to a question from the user regarding a specific vehicle.

5. The computer-implemented method of claim 1, wherein the communicated one or more vehicle recommendations includes information unavailable on a webpage the user is currently viewing at the time the one or more vehicle recommendations is communicated.

6. The computer-implemented method of claim 1, wherein the one or more vehicle recommendations is communicated via a plug-in application operating on the user device.

7. The computer-implemented method of claim 1, wherein the plurality of population characteristics includes one or more of economic status, automotive enthusiasm level, family status, location, interests, or hobbies.

8. The computer-implemented method of claim 1, wherein the vehicle characteristic includes at least one of safety information, handling information, climate control, entertainment features, audio system information, decorative features, or storage features.

9. The computer-implemented method of claim 1, further comprising updating the vehicle characteristics associated with the plurality of purchaser populations at a regular interval.

10. The computer-implemented method of claim 1, wherein the communicated one or more vehicle recommendations includes a hyperlink.

11. The computer-implemented method of claim 1, wherein the internet browsing history is a first internet browsing history, further comprising updating the profile based on a second internet browsing history, received after the first internet browsing history.

12. The computer-implemented method of claim 11, wherein the profile is developed using the neural net.

13. A computer-implemented method for determining one or more vehicle recommendations, comprising:
    associating characteristics of a plurality of purchaser populations with a plurality of vehicle characteristics using a neural net configured to:
        determine one or more population characteristics of a purchaser population;
        determine one or more vehicle characteristics of interest to the purchaser population based on characteristics of vehicles purchased by the purchaser population; and develop an association between the one or more population characteristics of the purchaser population and the one or more vehicle characteristics of interest to the purchaser population;

receiving, from time to time and via a plug-in application operating in conjunction with an internet browser, respective data pertaining to a user's internet browsing activity in using the internet browser;

using the received data and the neural net, generating a profile of the user indicative of one or more population characteristics of the user;

upon each successive time respective data pertaining to the user's internet browsing activity is received, iteratively updating the profile of the user, using the neural net, based on the respective data pertaining to the user's internet browsing activity;

comparing the one or more population characteristics of the user to the population characteristics of the plurality of purchaser populations;

identifying at least one vehicle characteristic of the plurality of vehicle characteristics as a vehicle characteristic of interest to the user based on the comparison of the one or more population characteristics of the user to the population characteristics of the plurality of purchaser populations and on the association between the plurality of vehicle characteristics and the population characteristics of the plurality of purchaser populations;

using the one or more identified vehicle characteristic of interest to the user, determining one or more vehicle recommendations; and communicating to a user device associated with the user the one or more vehicle recommendations.

14. The computer-implemented method of claim 13, wherein;
the neural net is configured to determine the one or more population characteristics of a purchaser population by analyzing literature pertaining to vehicles; and
the literature includes at least one of an article, a blog post, a review, or a discussion forum.

15. The computer-implemented method of claim 13, wherein the one or more population characteristics includes one or more of economic status, automotive enthusiasm level, family status, location, interests, or hobbies.

16. The computer-implemented method of claim 13, wherein the one or more vehicle characteristics includes at least one of safety information, handling information, climate control, entertainment features, audio system information, decorative features, or storage features.

17. The computer-implemented method of claim 13, further comprising updating the plurality of vehicle characteristics of interest to the plurality of purchaser populations at a regular interval.

18. The computer-implemented method of claim 13, wherein the communicated one or more vehicle recommendations includes a hyperlink.

19. A computer-implemented method for determining one or more vehicle recommendations, comprising:

accessing a plurality of literature sources pertaining to vehicles, the plurality of literature sources indicative of a plurality of population characteristics and a plurality of vehicle characteristics;

inputting the plurality of literature sources into a neural net configured to determine groupings of one or more of the population characteristics and one or more of the vehicle characteristics that, based on the plurality of literature sources, are correlated with each other;

using the determined groupings to generate a library that, for each of the groupings:
defines a purchaser population based on the one or more population characteristics of the grouping; and
associates the defined purchaser population with the one or more vehicle characteristics of the grouping;

receiving, from time to time and via a plug-in application operating in conjunction with an internet browser, respective data pertaining to a user's internet browsing activity in using the internet browser;

using the received data and the neural net, generating a profile of the user indicative of one or more population characteristics of the user;

upon each successive time respective data pertaining to the user's internet browsing activity is received, iteratively updating the profile of the user, using the neural net, based on the respective data pertaining to the user's internet browsing activity;

comparing the one or more population characteristics of the user to the population characteristics of the plurality of purchaser populations stored in the library to identify one or more purchaser populations sharing at least one of the one or more population characteristics of the user;

identifying one or more of the vehicle characteristics associated with the one or more identified purchaser populations as one or more vehicle characteristics of interest to the user;

using the one or more vehicle characteristics of interest to the user, determining a first vehicle recommendation;

communicating, to a user device associated with the user, the first vehicle recommendation;

receiving, via the user device, feedback from the user regarding the first vehicle recommendation;

using the feedback, determining a second vehicle recommendation; and communicating to the user device the second vehicle recommendation.

* * * * *